United States Patent
Toyoda et al.

(10) Patent No.: US 7,127,645 B2
(45) Date of Patent: Oct. 24, 2006

(54) SKEW COMPENSATION METHOD

(75) Inventors: Hidehiro Toyoda, Musashino (JP); Hiroaki Nishi, Kawasaki (JP)

(73) Assignee: Hitachi, Ltd., Chiyoda-ku (JP)

( * ) Notice: Subject to any disclaimer, the term of this patent is extended or adjusted under 35 U.S.C. 154(b) by 557 days.

(21) Appl. No.: 10/730,888

(22) Filed: Dec. 10, 2003

(65) Prior Publication Data

US 2004/0123190 A1   Jun. 24, 2004

(30) Foreign Application Priority Data

Dec. 10, 2002   (JP) .............................. 2002-357416

(51) Int. Cl.
*G11B 20/20*   (2006.01)

(52) U.S. Cl. ...................................... 714/700

(58) Field of Classification Search ................. 714/700
See application file for complete search history.

(56) References Cited

U.S. PATENT DOCUMENTS

| 5,408,473 | A | * | 4/1995 | Hutchison et al. .......... 370/506 |
| 6,167,077 | A | * | 12/2000 | Ducaroir et al. ............ 375/219 |
| 6,704,890 | B1 | * | 3/2004 | Carotti et al. ............... 714/700 |
| 6,731,656 | B1 | * | 5/2004 | Slater et al. ................ 370/536 |

FOREIGN PATENT DOCUMENTS

JP   2000-341135   5/1999

* cited by examiner

*Primary Examiner*—Shelly Chase
(74) *Attorney, Agent, or Firm*—Reed Smith LLP; Stanley P. Fisher, Esq.; Juan Carlos A. Marquez, Esq.

(57) ABSTRACT

In a high-speed serial-to-parallel conversion transmission system, a transmitter inserts pattern data composed of a combination of a plurality of idle characters in a signal to be transmitted such that a receiver measures an amount of skew, while the receiver measures the amount of skew and performs delay control over the received signal. By using the idle characters as the pattern data, a skew compensation pattern can be inserted as invalid data in a transmitted data stream containing valid data.

16 Claims, 7 Drawing Sheets

SKEW COMPENSATION METHOD

BACKGROUND OF THE INVENTION (1) Field of the Invention

The present invention relates to a skew compensation method and a skew compensation apparatus for automatically compensating for skew occurring among a plurality of serial transmission paths used for high-speed signal transmission with parallel-to-serial conversion.

(2) Description of the Related Art

Parallel-to-serial transmission is a technology which serializes a parallel signal by time division multiplexing, transmits the resultant serial signal, and then parallelizes the serial signal again at a receiver. The technology allows the elimination of the problem of bit-to-bit skew which is conspicuous when the rate of parallel transmission is increased. To implement parallel-to-serial transmission in a broader band, it is necessary to increase the rate of serial transmission, but the acceleration of serial transmission is limited. For broader-band parallel-to-serial transmission, therefore, an approach of using a plurality of serial signals in parallel has been proposed. However, the approach entails the occurrence of skew between the serial signals, similarly to the parallel transmission.

It is inherently possible to suppress the skew by installing each of the plurality of transmission paths over an equal distance. Due to reduced margin resulting from higher-speed signal transmission, however, it is difficult to install all the lines for serial signals such that they have equal lengths. In particular, tremendous skew occurs in proportion to a transmission distance in the case of WDM (Wavelength Division Multiplexing) used for optical communication. In the WDM, a plurality of, serial signals are transmitted in parallel by utilizing the property of a single optical fiber which carries a plurality of optical signals with different wavelengths. In this case, however, the different wavelengths cause tremendous skew irrespective of equal transmission distances.

Japanese Unexamined Patent Publication No. 2000-341135 discloses a technology which transmits a test pattern in equiphase from each of the transmitters for serial signals to eliminate skew occurring among a plurality of serial signal transmission paths. In accordance with the invention disclosed in the precedent document, each of receivers sends the timing of a synchronization signal to a controller. The controller sets the delay line of the transmitter with the most delayed one of the received timings and thereby matches the reception timings at the receivers.

However, since the foregoing method sends a test pattern by switching normal data to the test pattern, the skew cannot be monitored during the transmission of the normal data so that a sudden skew shift is beyond handling.

SUMMARY OF THE INVENTION

It is therefore an object of the present invention to provide a skew compensation apparatus and a skew compensation method which constantly monitor skew occurring during the transmission of a plurality of serial signals, such as the high-speed serial-to-parallel transmission mentioned above, and automatically compensate for the skew, thereby handling the skew among transmission paths and a sudden skew shift.

According to the present invention, a path through which a received signal passes is divided into two branch signal paths, of which one is connected to a delay controller for monitoring the state of skew and the other is connected to a delay buffer for delaying the received signal by a delay time determined by an amount of skew. The delay controller monitors the state of skew and, if a change occurs in the state of skew being monitored thereby, calculates the delay time for the received signal based on the change in the amount of skew. The calculated delay time is transmitted to the delay buffer which temporally delays the received signal, whereby the amount of skew is adjusted.

In order to perform constant monitoring, the present invention constitutes askew pattern by using a character stream in which an idle pattern can be inserted.

DESCRIPTION OF THE PREFERRED EMBODIMENTS

Embodiment 1

A first embodiment of the present invention will be described herein below with reference to the drawings. Although specific numerical values are used in the following description for the sake of clarity, they are only exemplary and the present invention is by no means limited to these values.

Figure 1:
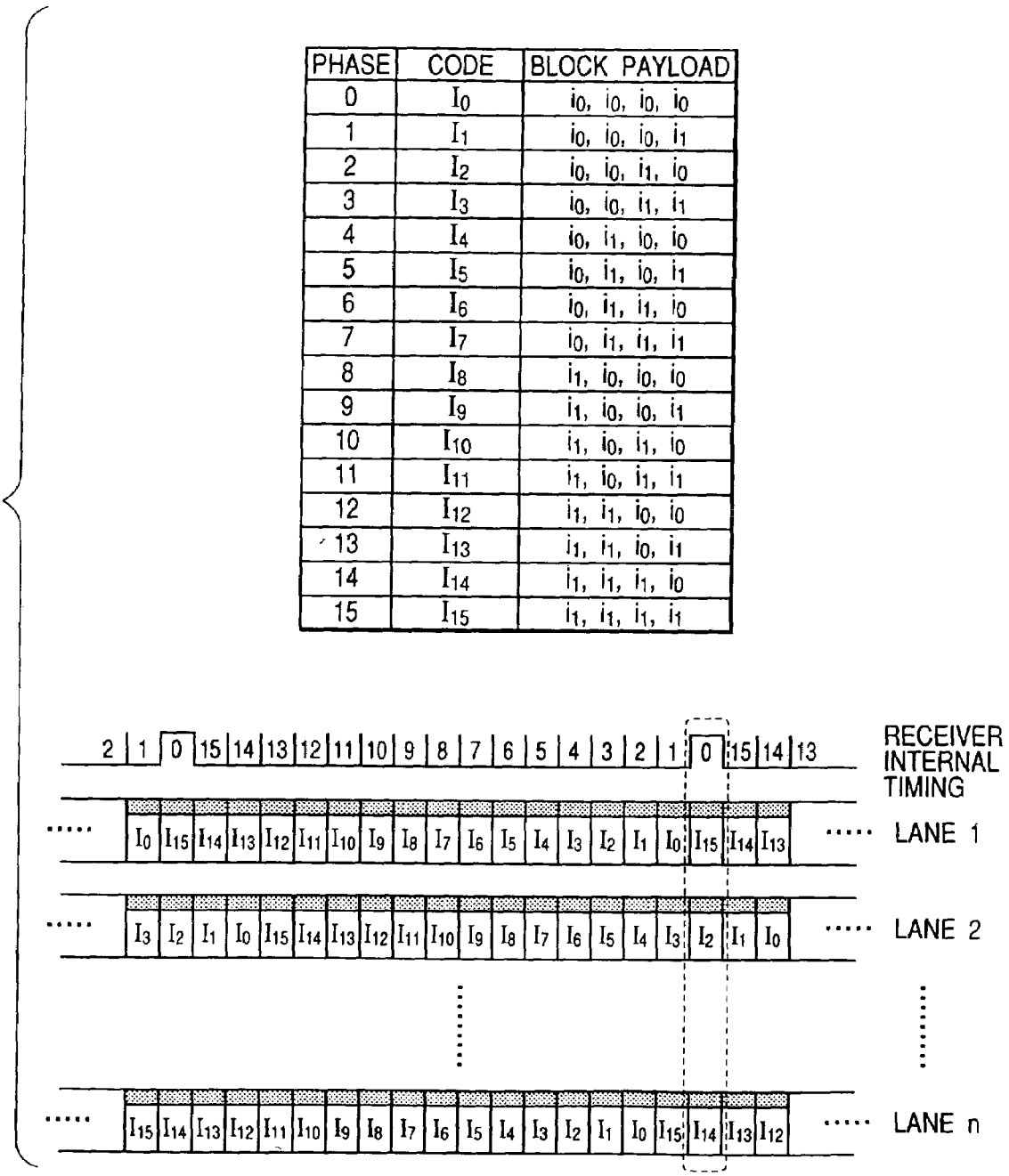
FIG. 1 is a view showing skew compensation patterns and phase shifts at the time of signal reception.

The present invention is characterized in that skew compensation patterns shown in FIG. 1 are prepared and skew compensation is performed by transmitting the skew compensation patterns from a serial data transmitter and measuring the amount of the skew at a receiver.

Figure 2:
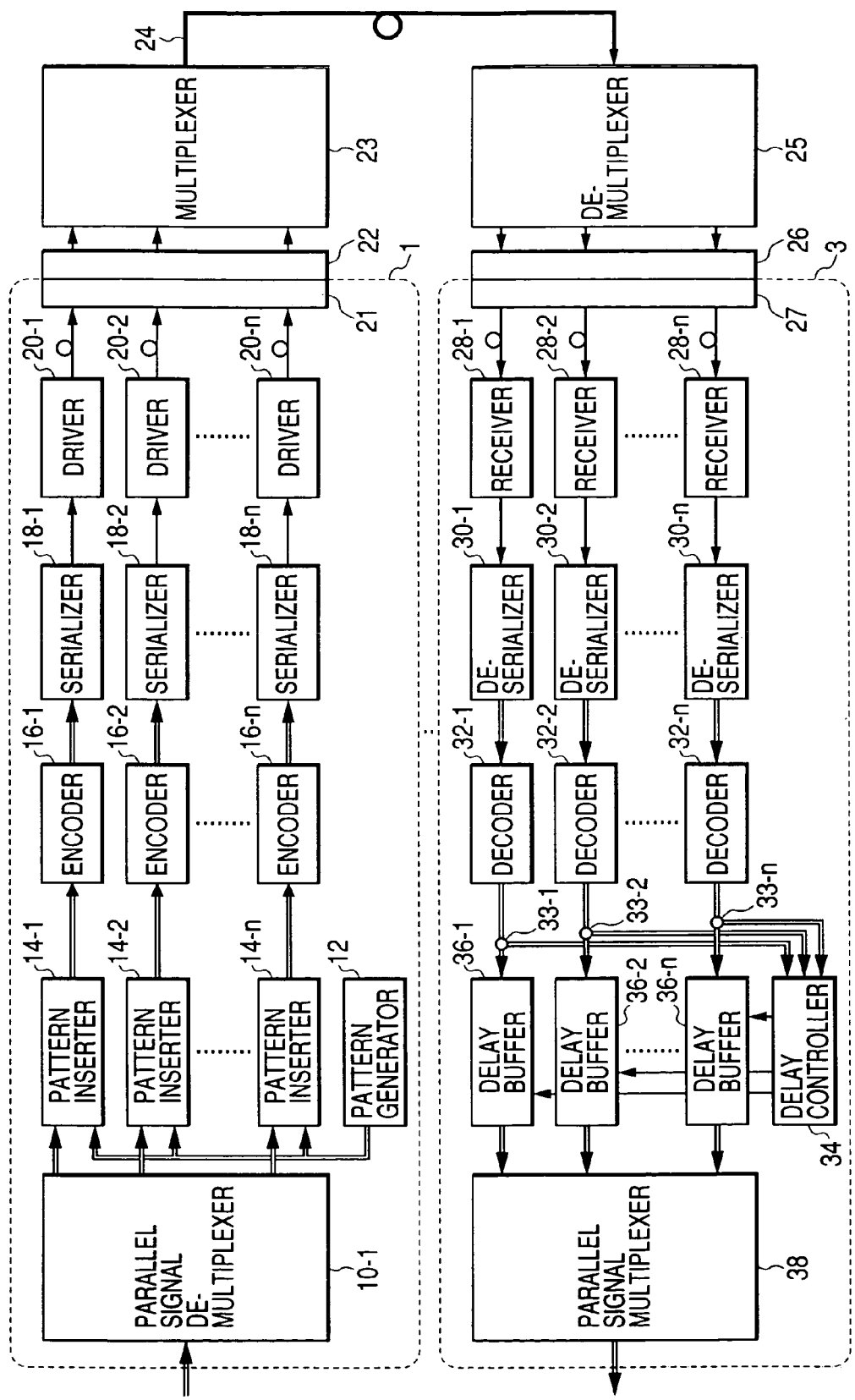
FIG. 2 is a view showing a first embodiment of the present invention.

Referring to FIG. 2, a description will be given first to the overall structure of an apparatus.

A parallel signal transmission apparatus having a skew compensating function according to the present invention is constituted by a transmitter 1 and a receiver 3. The transmitter 1 inserts a skew compensation pattern in a data stream of a parallel signal, converts the parallel signal to a plurality of serial signals, and outputs the plurality of serial signals. A transmission line unit performs wavelength multiplexing with respect to the plurality of serial signals received from the transmitter 1, transmits the serial signals over a long distance by using a single optical fiber, and outputs the serial signals after performing wavelength demultiplexing again on the received signals.

The receiver 3 parallelizes the plurality of serial signals received from the transmission line unit. At this time, the plurality of serial signals have skew that has occurred during the transmission. The receiver 3 calculates an amount of skew among the individual transmission lines from the skew compensation pattern inserted by the transmitter 1, inserts delays in the respective transmission paths such that the skew is cancelled out, and thereby establishes the temporal matching property of the parallel signal.

A detailed description will be given next to the structure and operation of each component.

The transmitter 1 is comprised of a parallel signal demultiplexer 10, a compensation pattern generator 12, compensation pattern inserters 14, encoders 16, serializers 18, drivers 20, and a connector 21.

Figure 5:
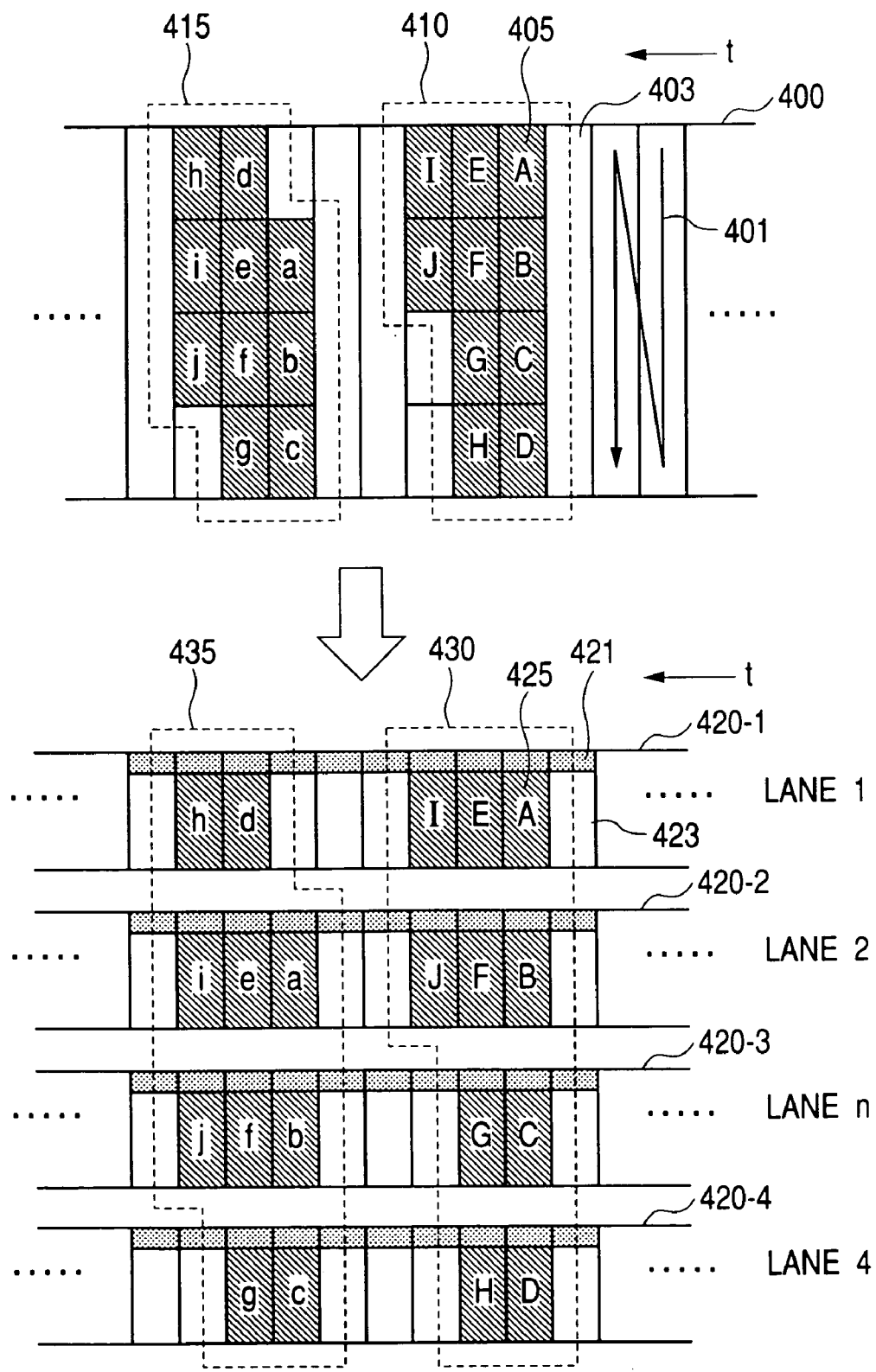
FIG. 5 is a view illustrating a method for demultiplexing a parallel data stream into a plurality of lanes.

As shown in FIG. 5, a parallel data stream 400 is inputted to the parallel signal demultiplexer 10. In the parallel data stream 400, a bit stream is arranged in the direction indicated by the arrow 401. The bit stream contains data 410 (and 415) in the state of a packet. In the present description, data in the state of a packet is termed "valid data" and unneeded data other than the valid data is termed "invalid data".

In FIG. 5, 403 denotes invalid data and the hatched portion 405 denotes valid data. The bit stream mentioned above is inputted continuously in a temporal direction to the transmitter 1. The parallel signal demultiplexer 10 demultiplexes the inputted parallel data stream into a plurality of lanes 420 each having a given bit width. If it is assumed that the bit width is 32 bits and the data stream is composed of 128 bits in the present description, the data stream can be demultiplexed into four lanes from a lane 1 (420-1) to a lane 4 (420-4). A data stream in each of the lanes is composed of a header 421, empty data 423, and valid data 425. The header 421 indicates whether the data stream is the valid data 425 or the invalid empty data 423. By demultiplexing the data stream in this manner, the data 410 and the data 415 are demultiplexed into the individual lanes to provide the data 430 and the data 435, though synchronization in the temporal direction is retained.

A description will be given next to the skew compensation pattern generated by the compensation pattern generator 12.

The skew compensation pattern has plural types of patterns by combining a plurality of characters., as shown in the table of FIG. 1. A "character" is defined herein as a character system capable of determining valid data and invalid data and incorporating a control signal indicative of the start and end of an idle or a packet in invalid data, such as, e.g., a 8B/10B character. Each of the "$i_0$" and "$i_1$" in the block payloads (hereinafter referred to as the idle character) is a character indicative of an idle state or invalid state in which significant data is not transmitted. By using the idle character, the skew compensation pattern can be inserted as invalid data in a data stream containing valid data and easily separated therefrom.

The transmitter collectively transmits a plurality of idle characters as one character. For example, a "64B/66B" character defined by the IEEE 802.3ae is composed of eight 8B/10B characters transmitted collectively. By using a delimiter (synchronization point) for such characters as a delimiter for the patterns, the patterns can easily be separated from each other.

The present invention determines a required number of patterns in accordance with the following method.

(1) An amount of skew S occurring in the transmission line unit is assumed. For example, skew of 100 ps occurs on every transmission over a distance of 1 m.

(2) A transmission distance L (e.g., 80 km) is assumed.

(3) A maximum amount of phase P using the number of characters as a measurement unit is determined from the following numerical expression (1) where T is a transmission rate (e.g., 10 Gbit/s) in the transmission line unit and C is a length of a character (e.g., 66 bits):

$$P = T \times S \times L / C \qquad (1)$$

For the transmitter to transmit the pattern as a circulative pattern cycle and for the receiver to measure the amount of skew, the receiver is required to detect the start of each cycle and determine the first reaching lane and the last reaching lane so that at least "2P+1" patterns are necessary. In the case of a system that allows the receiver to reliably predict the start of the pattern, for example, in such a case that the transmitter transmits only one cycle of the pattern after the completion of a set-up at the receiver, "P+1" is sufficient as the number of patterns because the process of detecting the start of the pattern cycle becomes unnecessary.

A description will be given next to an embodiment of pattern generation.

There is a character having a plurality of idle characters. For example, "K28.0", "K28.3", and "K28.5" are allocated as idle characters to a 8B/10B character. If a skew compensation pattern is formed by using these plurality of idle characters, they are allocated to the individual digits of a number represented in an n-digit number system. If the pattern is formed in a binary system, for example, allocation is performed in such a manner that the characters "$i_0$" and "$i_1$" correspond to the binary digits "0" and "1", respectively. If the pattern is formed in a ternary system, for example, the character "$i_2$" is allocated to the digit "2". The pattern represented as "1010" in the binary system can be converted to the pattern "$i_1, i_0, i_1, i_0$" and reverse conversion is also possible. Since the pattern represented as "1010" in the binary system corresponds to "12" in a decimal system, the pattern "$i_1, i_0, i_1, i_0$" is abbreviated as "$I_{12}$" in the embodiment of the present invention.

Figure 3:
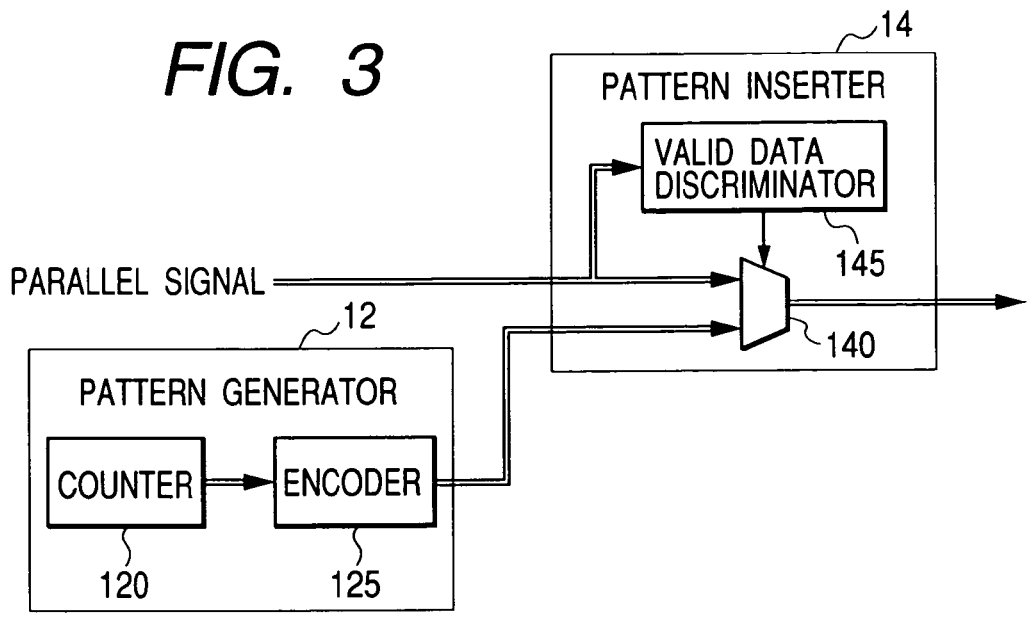
FIG. 3 is a view showing a compensation pattern generator and a compensation pattern inserter.

The compensation pattern generator 12 has the structure shown in FIG. 3 and is composed of a counter 120 and an encoder 125. A value generated in the counter 120 is a numerical value which circulates around the number of patterns. In the case of sixteen patterns shown in FIG. 1, the values "0, 1, 2, . . . 14, 15, 0, 1, . . . " are outputted. The encoder 125 generates a skew compensation pattern based on the values in accordance with the foregoing method. Consequently, the pattern generated from the compensation pattern generator 12 becomes circulative and, if the total of sixteen patterns shown in FIG. 1 are provided, e.g. , such a circulative pattern as "$I_0, I_1, I_2, \ldots I_{14}, I_{15}, I_0, I_1, I_2, \ldots$" is obtained.

A one-lane parallel signal outputted from the parallel signal demultiplexer 10 and a skew compensation pattern generated from the compensation pattern generator 12 are inputted to the compensation pattern inserter 14. The compensation pattern inserter 14 has the structure shown in detail in FIG. 3 and is composed of a selector 140 and a valid data discriminator 145.

The selector 140 selectively outputs one of the inputted parallel signal and the inputted skew compensation pattern. The selector 140 is controlled by the valid data discriminator 145. The valid data discriminator 145 discriminates valid data in the inputted parallel signal and controls the selector 140 such that the parallel signal is selectively outputted when the parallel signal is valid data and the skew compensation pattern is selectively outputted when the parallel signal is invalid data.

The encoder 16 receives the parallel signal from the compensation pattern inserter 14 and converts the data to characters for transmission. The parallel signals are converted into a serial signal in the serializer 18 and the serial signal is converted from an electric signal to an optical signal in each of the plurality of drivers 20-1 to 20-n so that the optical signal is outputted through the connector 21. The connector 21 forms the terminating portion of the transmitter 1 and is connected to the optical signal multiplexer 23 by a connector 22. Although the multiplexer 23 disclosed in the present embodiment is used as an external attachment part, the multiplexer 23 may also be contained in the transmitter 1.

The plurality of optical signals outputted from the transmitter 1 pass through the connector 22 and wavelength-multiplexed by the multiplexer 23. The optical signal is transmitted to a demultiplexer 25 through a single optical fiber 24. The demultiplexer 25 wavelength-demultiplexes the received optical signals. The optical signals that have been wavelength-demultiplexed is outputted to the receiver 3 through a connector 26.

The recover 3 is comprised of a connector 27 receiver elements 28, de-serializers 30, decoders 32, signal demultiplexers 33, a delay controller 34, delay buffers 36, and a parallel signal multiplexer 38. The serial signals carried through the transmission line unit pass through the connector 27 and are converted from the optical signals into electric signals by a plurality of receiver elements 28-1 to 28-n. After that, each of the electrical signals is converted from the serial data to parallel data by the de-serializer 30. The decoder 32 receives the parallel data, recognizes the transmitted characters, and decodes the transmitted characters.

Figure 4:
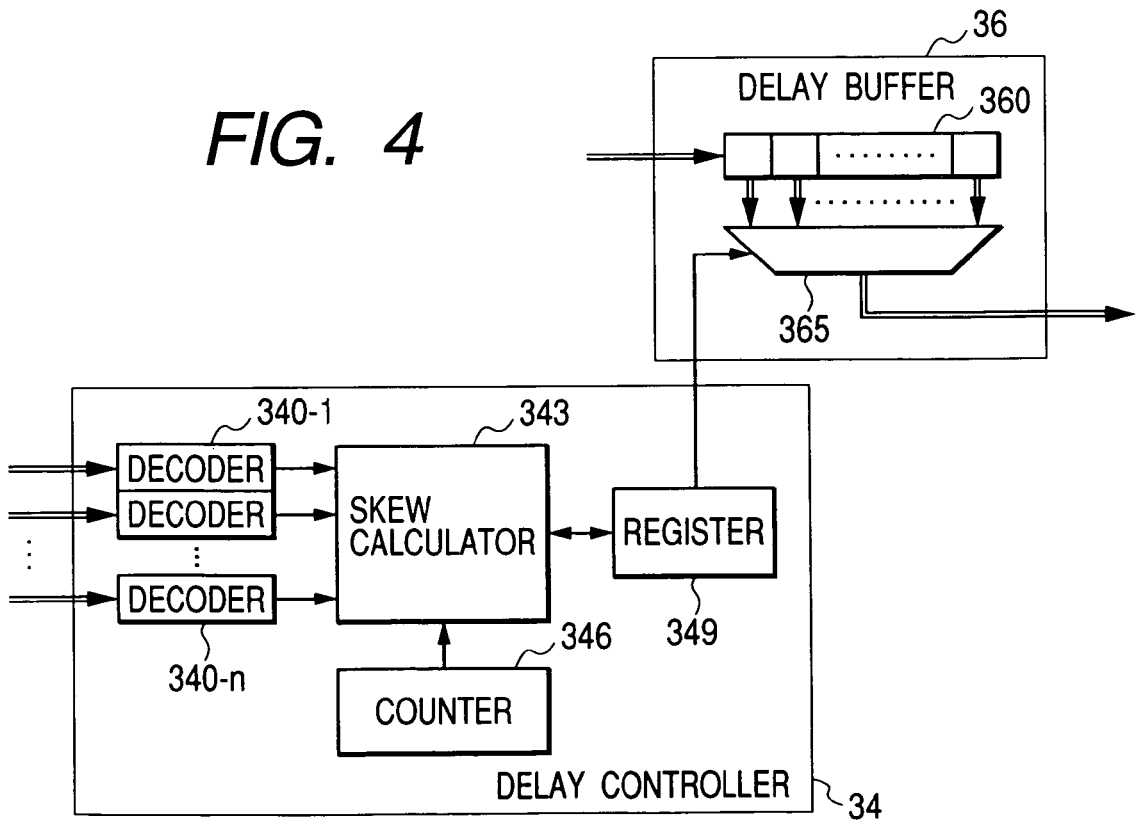
FIG. 4 is a view showing a delay controller and a delay buffer.

The parallel data outputted from a plurality of decoders 32-1 to 32-n are copied in the signal demultiplexers 33-1 to 33-n and then supplied to a plurality of corresponding delay buffers 36-1 to 36-n and to the delay controller 34. The delay controller 34 and the delay buffer 36 will be described in detail with reference to FIG. 4.

The delay controller 34 is comprised of a plurality of decoders 340-1 to 340-n, a skew amount calculator 343, a counter 346, and a register 349. The decoder 340 has the function of extracting a block payload (e.g. "$i_1, i_0, i_1, i_0$") consisting of the idle characters from the inputted parallel data and converting the extracted block payload to a phase value (e.g., "12") by using the table of FIG. 1. The counter 346 generates a count value (the receiver internal timing) which circulates around the number of patterns, similarly to the counter 120 of the transmitter 2. The skew amount calculator 343 calculates amounts of skew corresponding to the individual lanes from the phase value received from the plurality of decoders 343 and the count value received from the counter 346. The amounts of skew are held in the register 349 and presented as the current amounts of skew to the delay buffers 36.

Each of the delay buffers 36 is comprised of a shift register 360 and a selector 365. The parallel data inputted to the delay buffer 36 is sent first to the shift register 360. The shift register 360 shifts the inputted data on a per clock basis and outputs the data to the selector 365. The selector 365 reads out the data from the shift register 360 at the position at which the amount of skew presented by the register 349 is cancelled out and outputs the data.

The above circuit structure establishes a state in equiphase with no skew among the individual lanes, which is similar to that observed during transmission The parallel signal multiplexer 38 multiplexes the parallel data in equiphase received from the plurality of delay buffers 36-1 to 36-n, and outputs the recovered original parallel data stream.

A description will be given next to a method for calculating the amount of skew in the skew amount calculator 343.

Figure 6:
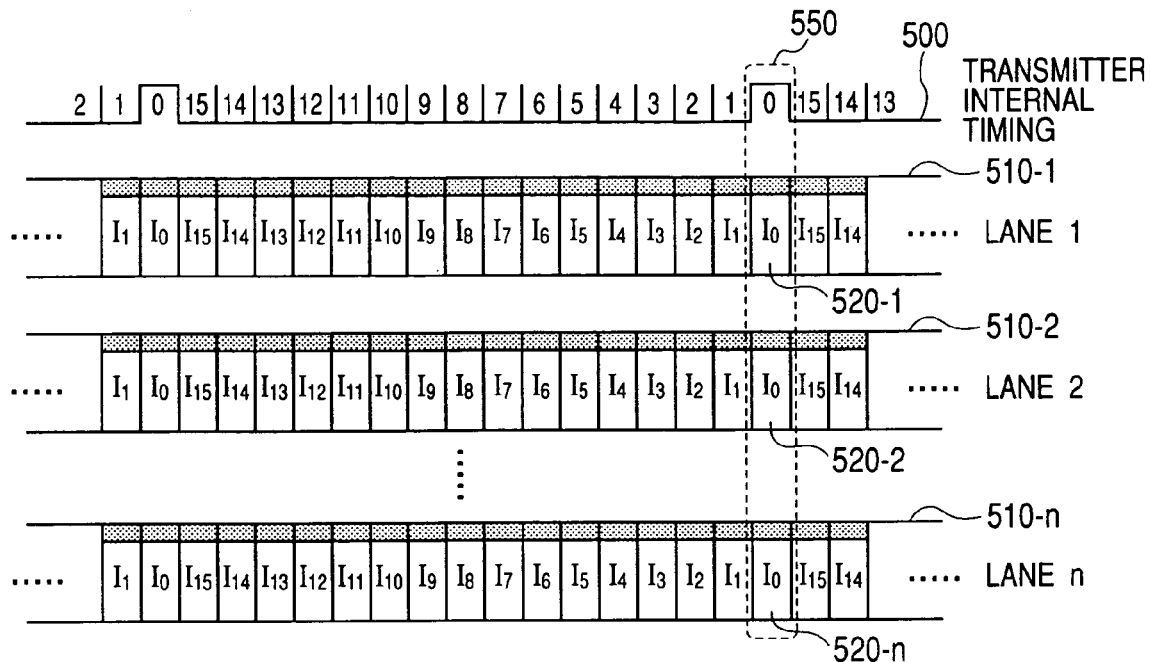
FIG. 6 is a view showing parallel data outputted from a transmitter.

As shown in FIG. 6, parallel data 510-1 to 510-n and transmitter internal timings 500 generated by the counter 120 are in synchronization with each other and all in equiphase. At a timing 550 indicative of T=0 among the transmitter internal timings 500, parallel data 520-1 to 510-n in the respective lanes 510-1 to 510-n indicate the same pattern "$I_0$".

Figure 7:
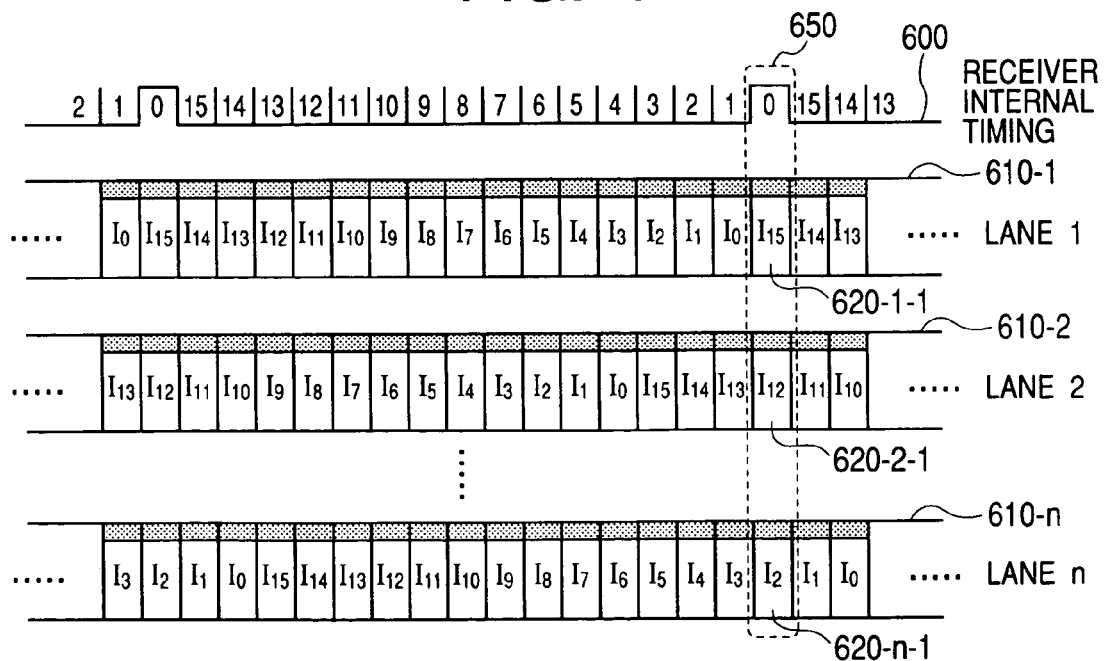
FIG. 7 is a view showing parallel data received by a receiver.

FIG. 7 shows the state of the parallel data received by the receiver 3 via the transmission line unit. Although the phases are equal in the individual lanes at the time of transmission, received patterns are different in individual lanes 610-1 to 610-n at the time of reception since temporal delays depending on individual paths are included. At a timing 650 indicative of T=0 among receiver internal timings 600, for example, a pattern 620-1 in the lane 1 (610-1) is "$I_{15}$", a pattern 620-2 in the lane 2 (610-2) is "$I_{12}$", and a pattern 620-n in the lane n (610-n) is "$I_2$". The skew amount calculator 343 receives a value obtained by decoding the pattern in each of the lanes, for example, "12" is received in the case of "$I_{12}$".

The skew amount calculator 343 determines differential values between the values obtained by decoding the patterns in the individual lanes and the receiver internal timings generated by the counter 346 and stores the differential values in the register 349. The differential values indicate skew values in the individual lanes and serve as positions at which data is read out from a shift register 360 in the delay buffer 36.

Embodiment 2

In contrast to the first embodiment in which the transmission line unit transmits the plurality of optical signals by using the WDM method, a second embodiment according to the present invention is characterized by the transmission of a plurality of optical signals using a parallel fiber obtained by bundling a plurality of optical fibers.

Figure 10:
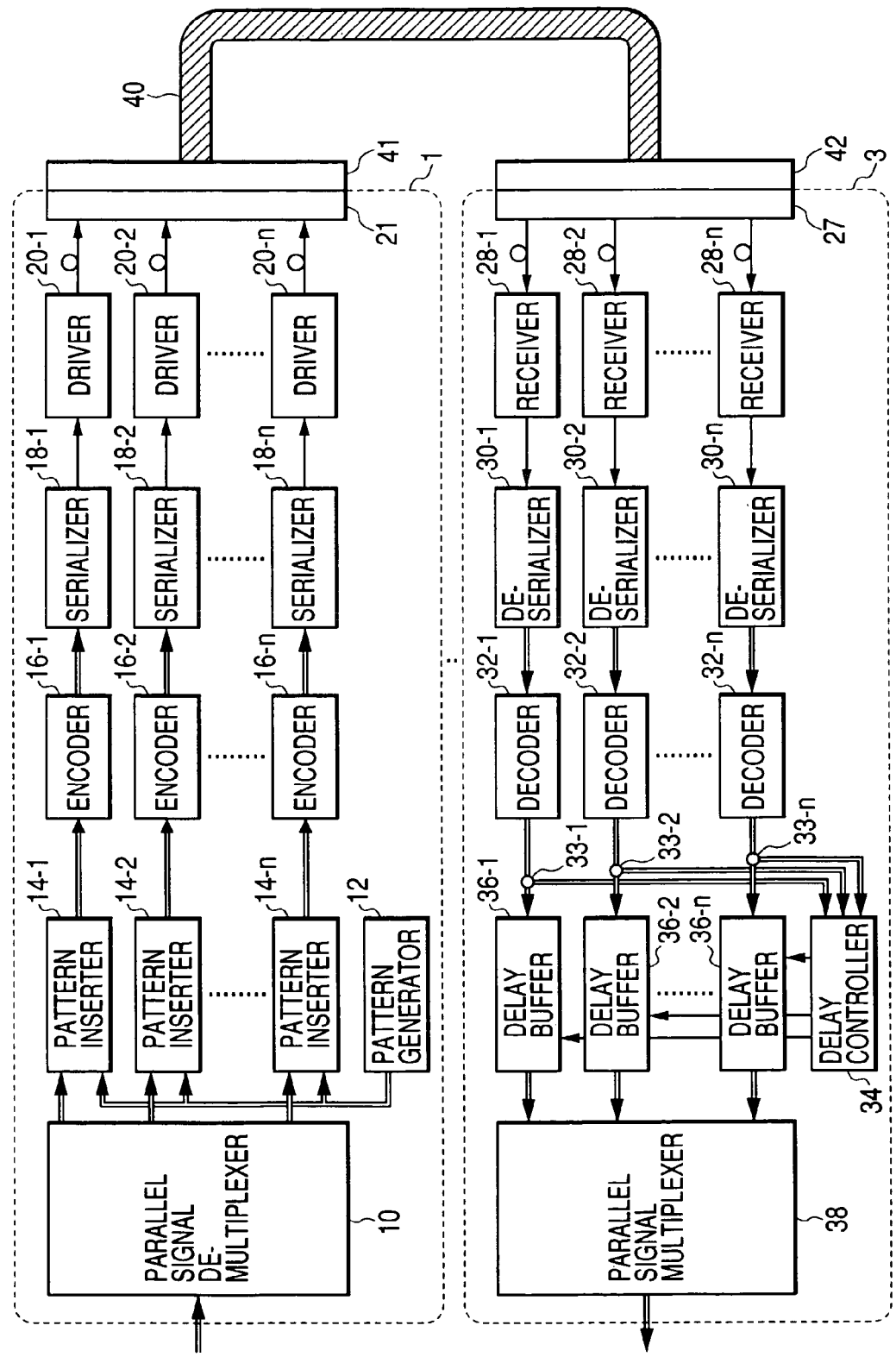
FIG. 10 is a view showing a second embodiment of the present invention.

FIG. 10 shows the structure of an apparatus according to the second embodiment by retaining the same reference numerals for the same components as used in the first embodiment.

In the transmission line unit, a plurality of optical signals outputted from transmitter 1 are sent out to a parallel fiber 40 through the connector 41. The parallel fiber 40 transmits the plurality of optical signals outputted from the drivers 20-1 to 20-n in parallel by using a single optical fiber as a transmission path for each of the optical signals. These optical signals are inputted to the receiver 3 through the connector 42. A plurality of optical signal input ports are provided between the connectors 21 and 40, though they are not depicted.

Embodiment 3

In the first embodiment, the skew amount calculator 343 determines the differential values between the values obtained by decoding the patterns in the individual lanes and the receiver internal timings generated by the counter 346 and stores the differential values in the register 349. By contrast, the third embodiment reads out the patterns in invalid data even when valid data is included in the parallel data in the individual lanes and determines the differential values between the patterns and the receiver internal timings in the same manner as in the first embodiment. In addition, the third embodiment compares the differential values with the differential values stored in the register 349 and judges that the current state is normal if the differential values are the same and that the skew has suddenly shifted if the differential values are different. In the event of a skew shift, the differential values are overwritten in the register 349 for skew compensation.

Figure 8:
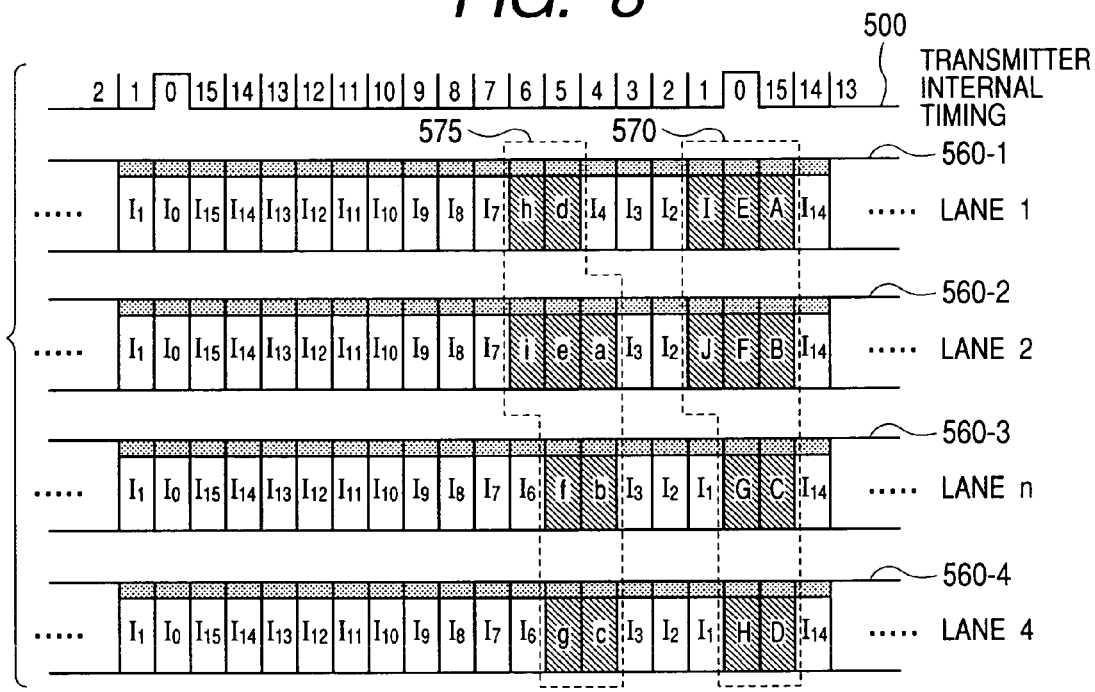
FIG. 8 is a view showing parallel data including valid data which is outputted from the transmitter.
Figure 9:
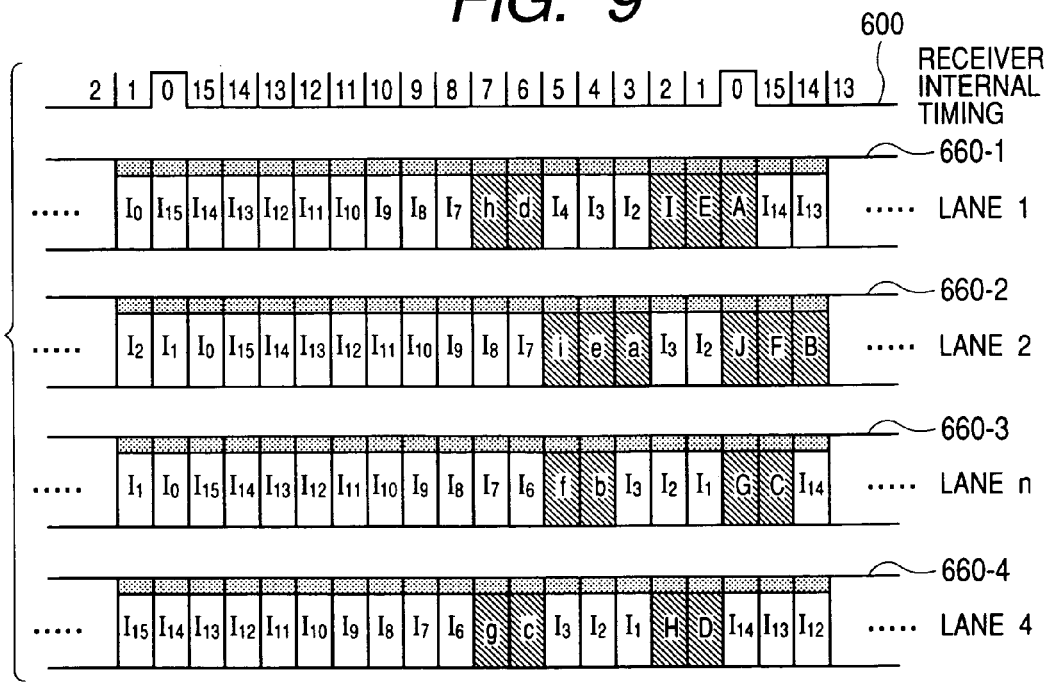
FIG. 9 is a view showing parallel data including valid data which is received by the receiver.

As shown in FIG. 8, if the inputted parallel data are data packets or the like in a network apparatus, they are transmitted with valid data 570 and 575 enveloped therein. Between the valid data 570 and 575, there is invalid data included. However, the probability that the receiver receives the invalid data in all the lanes at the receiver internal timings is low, as shown in FIG. 9. Then, the third embodiment independently operates the individual lanes so that the lane that has received the skew compensation pattern included as the invalid data performs the skew compensation, while the lane that has not received the skew compensation pattern is placed on standby until it receives the next skew compensation pattern. This method enables skew compensation even if all the lanes do not receive the skew compensation pattern at the same time.

Thus, the present invention constantly monitors skew occurring when a plurality of serial signals are transmitted by high-speed serial-to-parallel transmission and automatically compensates for the skew, thereby handling skew among transmission paths and a sudden skew shift.

What is claimed is:

1. A skew compensation apparatus comprising:
   a transmitter for transmitting a parallel signal to a transmission line unit after converting the parallel signal into a plurality of serial signals; and
   a receiver for performing skew compensation for the serial signals received from the transmission line unit,
   said transmitter comprising means for demultiplexing an inputted parallel signal into a plurality of parallel signal groups, means for generating a skew compensation pattern, means for inserting said skew compensation pattern in each of the parallel signal groups outputted from said demultiplexing, means for converting the plurality of parallel signal groups each containing the skew compensation pattern into a plurality of serial signals, and a first interface for transmitting the serial signals to the transmission line unit,
   said receiver comprising a second interface for receiving the serial signals from the transmission line unit, means for demultiplexing the serial signals received by the second interface into parallel signal groups each containing said skew compensation pattern, a plurality of delay buffers for delaying the individual parallel signal groups outputted from the demultiplexing, and a delay controller for extracting the skew compensation pattern from each of said parallel signal groups outputted from the demultiplexing,
   wherein said delay controller controls a delay time in each of said delay buffers depending on a state of the extracted skew pattern.

2. A skew compensation apparatus according to claim 1, wherein said means for generating a skew compensation pattern generates said skew compensation pattern by using a character stream in which an idle character can be inserted.

3. A skew compensation apparatus according to claim 2, wherein, in said character stream, a parameter P defined by $P = T \times S \times L / C$ satisfies $m \geq 2P+1$, where P is rounded up to an integral number if a fraction occurs, m is a natural number indicating the number of different patterns "$I_0, I_1, \ldots,$ and $I_{m-1}$" each composed by using x idle characters "$i_0, i_1, \ldots,$ in $i_{n-1}$ (where n is a natural number and $m \leq n^x$)" each indicative of an invalid signal allowed to flow when significant data is not transmitted, S (s/m) is an amount of skew assumed among individual serial transmission paths, L(m) is a transmission distance of each of the serial transmission lines, T (bit/s) is a transmission rate in the serial transmission line, and C(bit) is a bit length of said pattern.

4. A skew compensation apparatus according to claim 1, wherein said delay controller has a counter for generating an internal timing to constantly monitor a skew shift in each of the signals received from the transmission line by comparing said internal timing with a phase of said skew compensation pattern.

5. A skew compensation apparatus according to claim 1, wherein said delay controller changes each of said delay times depending on a phase of the skew pattern.

6. A skew compensation apparatus according to claim 1, wherein said delay controller is comprised of:
   a plurality of decoders each for separating said skew compensation pattern from each of said parallel signal groups containing the skew compensation pattern;
   a counter for generating an internal timing;
   a skew amount calculator for calculating an intrinsic amount of skew occurred in each of said parallel signal groups from a difference between a phase shown by said skew compensation pattern and said internal timing; and
   storing means for storing the amount of skew; and
   said delay controller changes the delay time in each of the delay buffers such that the amount of skew becomes zero.

7. A skew compensation apparatus according to claim 6, wherein said delay controller constantly monitors a state of skew in each of the parallel signal groups by comparing the internal timing generated by said counter with the phase shown by the skew compensation pattern.

8. A skew compensation apparatus according to claim 7, wherein said skew amount calculator calculates a differential value between said internal timing and said skew compensation pattern, compares said differential value with a differential value stored in said storing means, judges that the skew has shifted if the differential values are different, and overwrites the newly calculated differential value in said storing means.

9. A skew compensation apparatus according to claim 1, further comprising a multiplexer connected between said first interface and said transmission line unit.

10. A skew compensation apparatus according to claim 1, further comprising a demultiplexer connected between said second interface and said transmission line unit.

11. A skew compensation apparatus according to claim 1, further comprising:
    a first connector unit connected to said first interface, said first transmission unit including terminals for connecting to said first interface, a multiplexer for multiplexing said serial signals received from the terminals into wavelength-multiplexed signals, and a third interface for transmitting the wavelength-multiplexed signals to said transmission line unit.

12. A skew compensation apparatus according to claim 11, further comprising:
    a second connector unit connected to said second interface,
    said second connector unit including a fourth interface for receiving the wavelength-multiplexed signals from said transmission line unit, a demultiplexer for demultiplexing the wavelength-multiplexed signals received from the fourth interface into a plurality of serial signals on a per optical-wavelength basis, and terminals for transmitting the serial signals passed through the demultiplexer to said second interface.

13. The skew compensation apparatus according to claim 1, wherein said means for generating a skew compensation pattern includes a programmable IC.

14. A skew compensation method comprising the steps of:
demultiplexing a parallel signal to be transmitted into a plurality of parallel signal streams;
inserting a skew compensation pattern in each of the parallel signal streams resulting from the demultiplexing;
converting each of the plurality of parallel signal streams containing the skew compensation pattern into a serial signal;
transmitting the plurality of serial signals to a transmission line unit;
receiving the plurality of serial signals from said transmission line unit;
demultiplexing each of the received serial signals into parallel signal streams each containing the skew compensation pattern;
extracting the skew pattern from each of the parallel signal streams;
delaying at least one of said parallel signal streams by a delay time determined depending on a phase of the extracted skew pattern; and
multiplexing the parallel signal streams partially delayed into an original parallel signal.

15. A skew compensation method according to claim 14, wherein a character stream in which an idle character can be inserted is used as said skew compensation pattern.

16. A skew compensation method according to claim. 14, further comprising the step of wavelength-multiplexing the plurality of serial signals each containing the skew compensation pattern, wherein the wavelength-multiplexed signals are transmitted to said transmission line unit.

* * * * *